(12) United States Patent
Koo

(10) Patent No.: US 6,295,828 B1
(45) Date of Patent: Oct. 2, 2001

(54) APPARATUS FOR SWITCHING A REFRIGERANT CHANNEL OF AN AIR CONDITIONER HAVING COOLING AND WARMING FUNCTIONS

(75) Inventor: Hyoung-Mo Koo, Euiwang (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/543,159

(22) Filed: Apr. 4, 2000

(30) Foreign Application Priority Data

Sep. 8, 1999 (KR) .................................................. 99-38189

(51) Int. Cl.[7] .................................................. F25B 13/00
(52) U.S. Cl. .................................... 62/324.6; 137/625.43; 137/625.29
(58) Field of Search ...................... 62/324.6; 137/625.43, 137/625.29

(56) References Cited

U.S. PATENT DOCUMENTS

| | | | |
|---|---|---|---|
| 4,324,273 | * | 4/1982 | Bauer et al. ..................... 137/625.43 |
| 4,359,877 | * | 11/1982 | Coyne ..................................... 62/278 |
| 4,367,638 | * | 1/1983 | Gray ..................................... 62/324.6 |
| 4,381,798 | * | 5/1983 | Tobin et al. ..................... 137/625.43 |
| 4,445,343 | * | 5/1984 | McCarty ............................... 62/324.1 |
| 4,445,344 | * | 5/1984 | Ladusaw ............................... 62/324.6 |
| 4,573,497 | * | 3/1986 | White ............................... 137/625.29 |
| 5,491,981 | * | 2/1996 | Kim ..................................... 62/324.6 |
| 6,076,365 | * | 6/2000 | Benatav ................................. 62/160 |

\* cited by examiner

Primary Examiner—William Doerrler
Assistant Examiner—Mark S. Shulman
(74) Attorney, Agent, or Firm—Rober E. Bushnell, Esq.

(57) ABSTRACT

A refrigerant channel switching apparatus in an air conditioner having cooling and warming functions is provided. The apparatus includes a main valve body, a direction shifting chamber formed within the main valve body and having a four connecting ports connected to an output and an input of a compressor, an indoor heat-exchanger, and an outdoor heat-exchanger, respectively, an operating chamber formed in the main valve body having a plurality of connecting ports, an operational guide member contained in the operating chamber and disposed to rotate in the operating chamber, a partition formed with the operational guide member in a body and disposed to rotate within the direction shifting chamber of the main valve body, a pilot valve connected to the connecting ports of the operating chamber and causing the direction shifting chamber to switch a connection between a compressor, an indoor heat-exchanger, and an outdoor heat-exchanger.

30 Claims, 7 Drawing Sheets

→ COOLING
--→ WARMING

APPARATUS FOR SWITCHING A REFRIGERANT CHANNEL OF AN AIR CONDITIONER HAVING COOLING AND WARMING FUNCTIONS

CLAIM OF PRIORITY

This application makes reference to, incorporates the same herein, and claims all benefits accruing under 35 U.S.C. §119 from my application entitled APPARATUS FOR SELECTING DIRECTIONAL REFRIGERANT PASSAGE OF A COOLING AND HEAT PUMP TYPE AIR-CONDITIONER filed with the Korean Industrial Property Office on Sep. 8, 1999 and there duly assigned Ser. No. 38189/1999.

BACKGROUND OF THE INVENTION

1. Field of the Invention

The present invention relates to a channel switching apparatus for switching a flow direction of a fluid, and more particularly to an apparatus for switching a refrigerant channel of an air conditioner having both cooling and warming functions.

2. Description of the Prior Art

A refrigeration cycle in an air conditioner serves as a heating pump for a warming operation and a cooler for a cooling operation. Depending on a flow direction of a refrigerant, the air conditioner performs the cooling operation or the warming function by using a characteristic of the refrigeration cycle. Accordingly, the air conditioner having cooling and warming functions needs a refrigerant channel switching apparatus for switching the flow direction of the refrigerant and reversing the refrigeration cycle.

The refrigeration cycle of the air conditioner having cooling and warming functions is shown in FIG. 1. A compressor 1 compresses a refrigerant and discharges the compressed refrigerant into either an outdoor heat exchanger 2 or an indoor heat exchanger 4. A refrigerant channel switching device 5 is disposed between compressor 1 and heat exchanger 2 or 4 to switch the flow direction of the refrigerant from compressor 1 to either outdoor heat exchanger 2 or indoor heat exchanger 4 or from either outdoor heat exchanger 2 or indoor heat exchanger 4 to compressor 1. An expansion valve 3 is disposed between each output port of outdoor heat exchanger 2 and indoor heat exchanger 4 to connect the output ports and form a closed loop or a passageway of the refrigerant which is discharged from outdoor heat exchanger 2 or indoor heat exchanger 4 and a closed loop. A reference numeral 6 is an outdoor blower, and 7 is an indoor blower.

The refrigeration cycle initially performs the cooling operation, in which the refrigerant circulates in the direction of a solid arrow as shown in FIG. 1. Accordingly, the refrigerant discharged from compressor 1 circulates through refrigerant channel switching device 5, outdoor heat-exchanger 2, expansion valve 3, indoor heat-exchanger 4, refrigerant channel switching device 5, and compressor 1. Thus, the cooling operation is performed by indoor heat-exchanger 4 while outdoor heat-exchanger 2 serves as a condenser, and indoor heat-exchanger 4 serves as evaporator.

For the warming operation, the flow direction of the refrigerant is reversely shifted by the refrigerant channel switching device 5. Accordingly, the refrigerant circulates in the direction of a dotted arrow as shown on FIG. 1. The refrigerant discharged from the compressor 1 circulates through refrigerant channel switching device 5, indoor heat-exchanger 4, expansion valve 3, outdoor heat-exchanger 2, refrigerant channel switching device 5, and the compressor 1. Thus, the warming operation is performed in indoor heat-exchanger 4 while outdoor heat-exchanger 2 serves as an evaporator, and indoor heat-exchanger 4 serves as a condenser.

The refrigerant channel switching device used in the air conditioner having cooling and warming functions must switch the flow direction of the refrigerant without leakage of the refrigerant and include a precise switching mechanism for matching the input ports and output ports of the device. The conventional refrigerant channel switching device has the drawback of a complicated assembling process due to a complicated structure and a great number of parts. Particularly, due to their structural characteristics, it is very difficult to manufacture parts of the mechanism, assemble the complicated apparatus, and maintain the precise switching operation of the apparatus.

Furthermore, the conventional refrigerant channel switching device has a deteriorated reliability rate of its valve when used for a long period of time because the mechanism has to maintain a secure contact between the mechanism and the ports of the apparatus.

SUMMARY OF THE INVENTION

It is an object of the present invention to provide an improved refrigerant channel switching apparatus suitable to an air conditioner having a cooling function and a warming function.

It is another object to provide an refrigerant channel switching apparatus capable of switching a cooling function to a warming function.

It is yet another object to provide an refrigerant channel switching apparatus which requires less number of parts and includes a significantly reduced number of parts.

It is still another object to provide an refrigerant channel switching apparatus capable of being simply assembled.

It is a further object to provide an refrigerant channel switching apparatus capable of accurately switching a flow direction of the refrigerant without leakage of the refrigerant.

It is another further object to provide an refrigerant channel switching apparatus capable of being sealed in an air conditioner having a cooling function and a warming function.

It is a still another further object to provide an refrigerant channel switching apparatus capable of reducing a noise generated from the apparatus during switching a flow direction of the refrigerant.

It is an also object to provide an refrigerant channel switching apparatus capable of maintaining high reliability of the apparatus for a long period of time in an air conditioner having a cooling function and a warming function.

These and other objects may be achieved by providing a refrigerant channel switching apparatus including a main valve body having at least one operation chamber and a direction shifting chamber; a channel switching member rotatably disposed in the main valve body to rotates in alternate directions for selectively switching the refrigerant channel of the direction shifting chamber; and a pilot valve for alternately rotating the channel switching member by using high pressure refrigerant.

First and second connecting ports formed on the operation chamber at equal intervals is connected to the pilot valve. A plurality of connecting ports are formed on the direction shifting chamber. A high pressure connecting port is connected to a refrigerant discharging port of a compressor, a low pressure connecting port is connected to a refrigerant suctioning port of the compressor, and bidirectional connecting ports are connected to indoor and outdoor heat-exchangers, respectively.

The channel switching member includes upper and lower plates spaced-apart from each other at a certain space interval. The center bar and the operational guide member are integrally formed on the upper plate and are positioned in the operation chamber. A chamber partition is integrally formed between the upper and lower plates and is positioned in direction shifting chamber. By the rotation of the channel switching member in alternate directions, the partition of the direction shifting chamber rotates about an axis passing through a center line of main valve body to shift the channel in the direction shifting chamber. By shifting the channel, the high pressure connecting port is communicated with either the indoor heat-exchanger connecting port or the outdoor heat-exchanger connecting port.

The pilot valve includes a cylindrical valve body, a piston movably disposed in the valve body to linearly move in a reciprocal manner, a spring elastically biasing the piston toward a certain direction, a solenoid coil attached to the outer circumference of the valve body to move the piston against the elastic force of the spring, and a plurality of connecting ports formed on an outer circumference of the vale body and spaced-apart from each other at equal space intervals. A third connecting port connected to a first pipe connected to the high pressure connecting port of the main valve body. A fourth connecting port connected to a second pipe connected to the low pressure connecting port of the main valve body. A fifth connecting port and a sixth connecting port respectively connected to the first and second connecting ports of the main valve body.

The piston includes a first pilot partitioning plate for a cooling operation and a second pilot partitioning plate positioned for a warming operation. The spring and the solenoid coil cause the piston to move in alternate directions. In accordance with the movement of the piston, either the first pilot partitioning plate or the second pilot partitioning plate is disposed to be associated with the second, third, fifth, and sixth connecting ports. The plane of the pilot partitioning plate has a perpendicular relationship with the first pilot partitioning plate.

In cooling operation, the first pilot partitioning plate is associated with the connecting ports. The third connecting port is communicated with the fifth connecting port while the fourth connecting port is communicated with the sixth connecting port. In the warming operation, the piston moves against the elastic force of the spring, and the second pilot partitioning plate is associated with the connecting ports. The third connecting port is communicated with the sixth connecting port, while the four connecting port is communicated with the fifth connecting port.

A portion of refrigerant discharged from the compressor is selectively supplied through the first and second connecting ports by the operation of the pilot valve, and the channel switching is performed by the channel switching member. By the supply of the high pressure refrigerant into the operation chamber through the first connecting port, the channel switching member rotates in a clockwise direction during the cooling operation, and the high pressure connecting port and the outdoor heat-exchanger connecting port of the direction shifting chamber are communicated with each other by the chamber partition of the channel switching member, while the indoor heat-exchanger connecting port and the low pressure connecting port are communicated with each other. Accordingly, the cooling operation is performed in the air conditioner.

During the warming operation, the high pressure refrigerant is supplied to the operation chamber through the second connecting port, and the channel switching member rotates in a counterclockwise direction. Accordingly, the higher pressure connecting port of the direction shifting chamber and the indoor heat-exchanger connecting port are communicated with each other by the chamber partition of the channel shifting member while the outdoor heat-exchanger connecting port and the low pressure connecting port are communicated with each other.

BRIEF DESCRIPTION OF THE DRAWINGS

A more complete appreciation of the invention, and may of the attendant advantages, thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
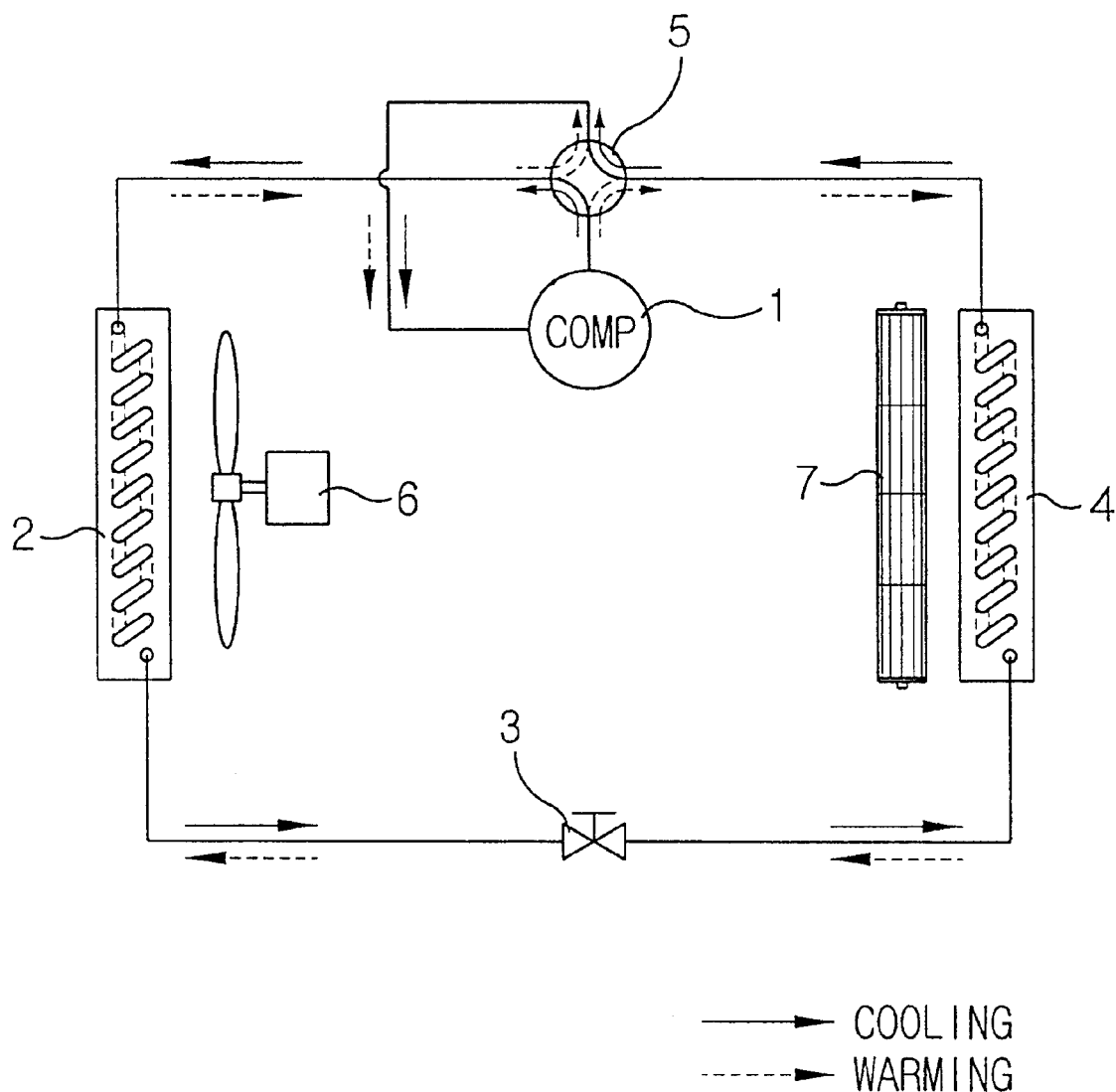
FIG. 1 is a schematic view of a refrigerant cycle of a conventional air conditioner having cooling and warming functions.
Figure 2:
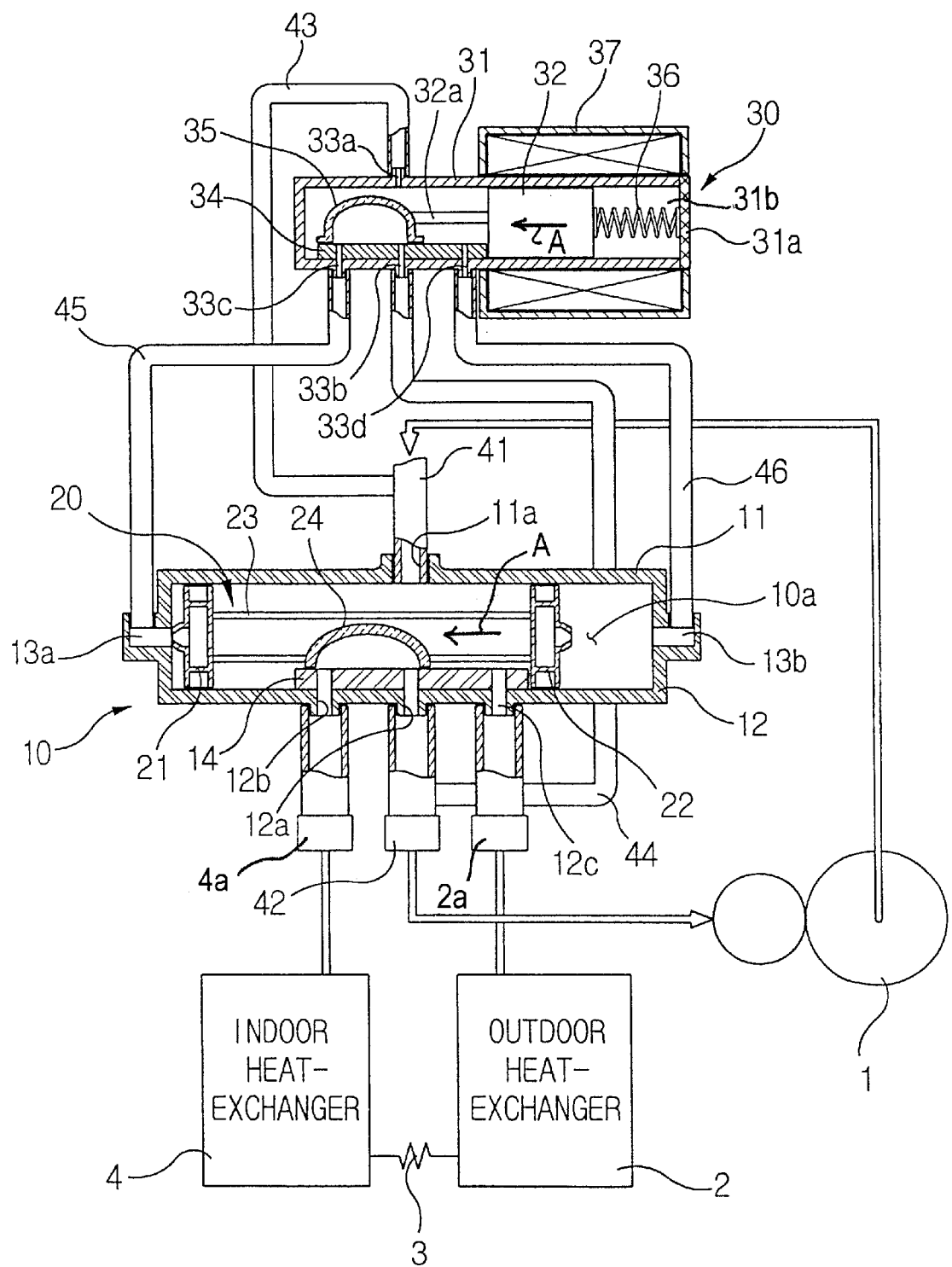
FIG. 2 is a cross sectional view of a refrigerant channel switching apparatus showing a switching mechanism switched on a cooling operation.
Figure 3:
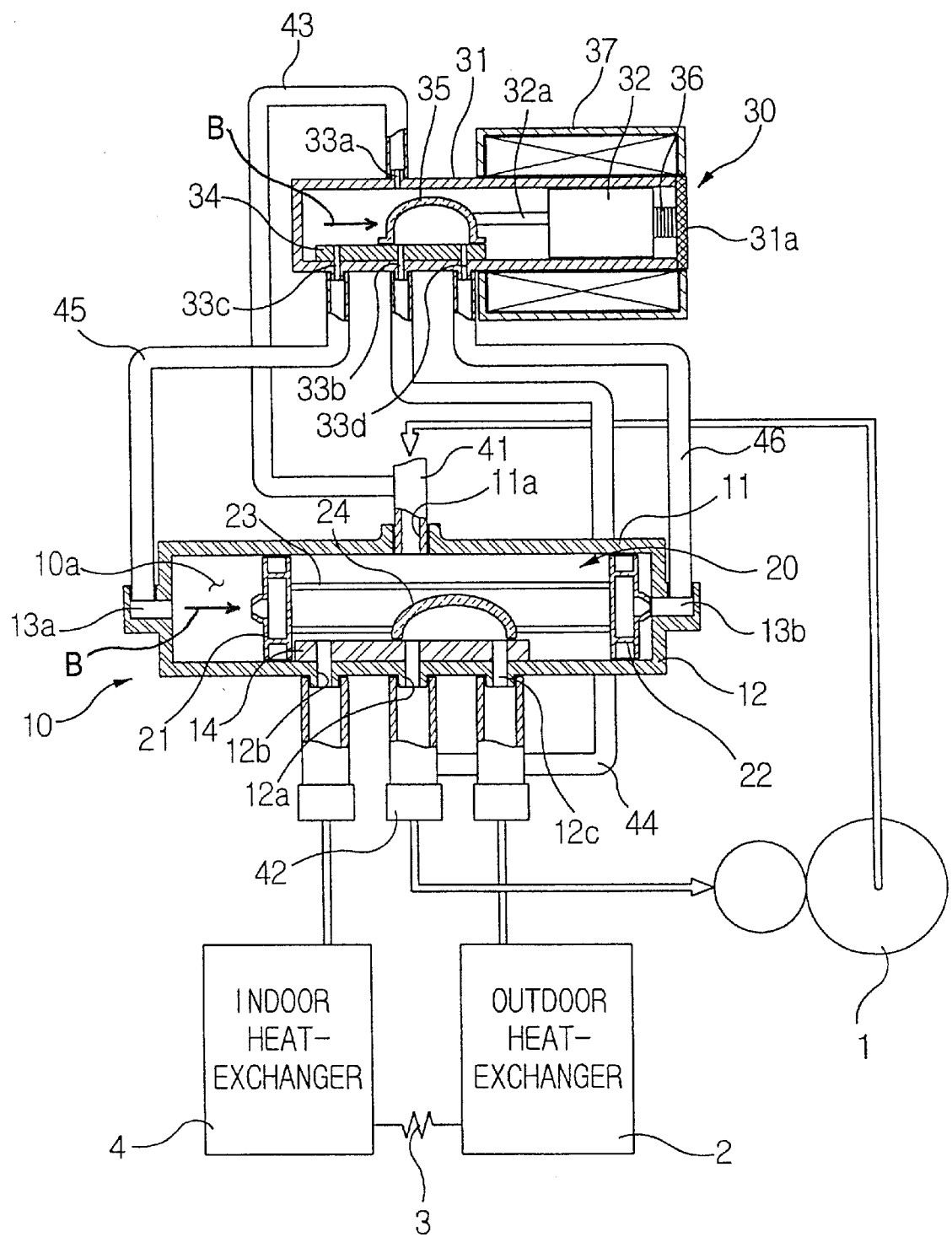
FIG. 3 is a cross sectional view of a refrigerant channel switching apparatus showing a switching mechanism switched on a warming operation.

Referring now to FIGS. 2 and 3, a refrigerant channel switching device includes a main valve body 10, connecting ports 11a, 12a, 12b, 12c, 13a and 13b formed on the main body 10, a direction shifting chamber 10a contained in main valve body 10 and having channels forming at least one passageway between the connecting ports, a slider assembly 20 disposed within shifting chamber 10a of main valve body 10 to linearly move in alternate directions thereby selectively switching the channel of the direction shifting chamber 10a, and a pilot valve 30 for linearly moving the slider assembly 20 in a reciprocal manner by using a high pressure refrigerant discharged from the compressor 1.

Main valve body 10 has a cylindrical structure formed of first and second bodies 11 and 12 having semi-cylindrical shapes which are coupled to each other. First body 11 is connected to a refrigerant discharge port 41 of compressor 1 through a high pressure connecting port 11a which is formed approximately on the middle portion thereof, and second body 12 has a low pressure connecting port 12a, an indoor heat-exchanger connecting port 12b connected to a first bidirectional port 4a of indoor heat exchanger 4, and an outdoor heat-exchanger connecting port 12c connected to a second bidirectional port 2a of outdoor heat exchanger 2. The low pressure connecting port 12a is connected to a refrigerant suction port 42 of compressor 1. Main valve body 10 has first and second connecting ports 13a and 13b on both sides of main valve body 10. First and second connecting ports are connected to pilot valve 30. Also, a sliding guiding member 14 is securely attached to an inside surface of second body 12. Three holes formed on sliding guide member 14 are corresponding to connecting ports 12a, 12b, 12c respectively.

A pair of discs 21 and 22 Slider assemblies 20 are spaced-apart from each other at a predetermined distance within slider assemblies 20. A diameter of discs 21 and 22 is smaller than the inside diameter of main valve body 10. Discs 21 and 22 is disposed to slidably move within slider assembly 20. A plurality of rods 23 connect both discs 21 and 22. A sliding member 24 connected approximately to a middle portion of rods 23 slidably moves along an outer surface of slide guide member 14, connects two ports 12a and 12b or 12a and 12c, and switch the channel forming a passageway between compressor 1, indoor heat exchanger 4, and outdoor hear exchanger 2 by selectively opening and closing the holes of slide guide member 14 of direction shifting chamber 10a. A passageway is formed between connecting port 11a and any one of connecting ports 12b and 12c while a second passageway is formed between connecting port 12b and any one of connecting ports 12b and 12d.

Pilot valve 30 includes a valve body 31 having a cylindrical shape, an opening 31b formed on one end of valve body 31, and a piston 32 disposed within valve body 31 to linearly move in a reciprocal manner. In order to permit piston 32 to be assembled within valve body 31, a cover 31 is secured to opening 31b after piston 32 is inserted into the inside of valve body 31.

A plurality of ports are formed on valve body 31. A third connecting port 33a is connected with a first pipe 43 which is connected between refrigerant discharging port 41 and the high pressure connecting port 11a of main valve body 10, and a fourth connecting port is connected to a second pipe 42 which is connected between refrigerant suction port 42 and the low pressure connecting port 12a of the main valve body 10 while fifth and sixth connecting ports 33c and 33d respectively connected to first and second connecting ports 13a and 13b of main valve body 10. A second sliding guiding member 34 is securely attached on valve body 31. Three holes formed on second sliding guiding member 34 are respectively corresponding to the connecting ports 33b, 33c, and 33d of valve body 31.

One end of rod 32a of the piston 32 is connected to second sliding member 35. Accordingly, second sliding member 35 slides along an upper surface of second sliding guiding member 34 by the movement of piston 32, connects two ports 33b and 33c or 33b and 33d, and selectively opens and closes connecting ports 33b, 33c, and 33d. A passageway of the refrigerant is formed between port 32a and any one of port 33c and 33d while a second passageway is formed between port 33b and any one of port 33c and 33d.

Piston 32 is elastically biased by a spring 36 which is disposed between cover 31a and piston 32 and moves in the direction of arrow A. A solenoid coil 37 is disposed on an outer circumferential surface of valve body 31 to move piston 32 against the elastic force of spring 36 in the direction of arrow B. Reference numerals 43, 44, 45, and 46 are copper pipes for connecting each connecting port of main valve body 10 to the corresponding connecting port of pilot valve 30.

Hereinafter, the operation of the refrigerant channel shifting apparatus constructed as above will be described. The refrigerant channel of the refrigerant cycle of an air conditioner having cooling and warming functions is initially switched to a state that performs the cooling operation as shown in FIG. 2. Piston 32 of pilot valve 30 moves in the direction of arrow A by the biased force of spring 36. Accordingly, third connecting port 33a of pilot valve 30 are communicated with sixth connecting ports 33d while fourth connecting ports 33b are communicated with fifth connecting port 33c via a space of second sliding member 35. A portion of the refrigerant discharged from compressor 1 is supplied to second connecting port 13b of main valve body 10 through pipe 43 and the communicated third and sixth connecting ports 33a and 33d of the pilot valve 10. Thus, slider assembly 20 moves in the direction of arrow A as shown in FIG. 2. Accordingly, high pressure connecting port 11a is communicated with outdoor heat-exchanger connecting port 12d while low pressure connecting port 12a is communicated with indoor heat-exchanger connecting port 12b via a space of first sliding member 24. The refrigerant discharged from the compressor 1 circulates to suction port of the compressor 1 through outdoor heat-exchanger 2, expansion valve 3, and indoor heat-exchanger 4. In accordance with the circulation of the refrigerant around a loop described above, the cooling operation is performed by indoor heat-exchanger 4.

In order to switch the cooling operation to the warming operation, the switch (not shown) is manipulated, and solenoid coil 37 of pilot valve 30 is activated. Piston 32 of pilot valve 30 moves in the direction of arrow B in response to the activation of solenoid coil 37. Third and fifth connecting ports 33a and 33c are communicated with each other while fourth and sixth connecting ports 33b and 33d are communicated with each other via the space of second sliding member 34. As a result, A portion of the refrigerant discharged from compressor 1 is supplied to first connecting port 13a of main valve body 10 through third and fifth connecting ports 33a and 33c, and slider assembly 20 of direction shifting chamber 10a moves in the direction of arrow B as shown in FIG. 3. High pressure connecting port 11a becomes to communicate with indoor heat-exchanger connecting port 12b of direction shifting chamber 10a while low pressure connecting port 12a becomes to communicate with outdoor heat-exchanger connecting port 12c via the space of first sliding member 24. The refrigerant discharged from the compressor 1 circulates to the suction port of the compressor 1 through indoor heat-exchanger 4, expansion valve 3, and outdoor heat-exchanger 2. In accordance with the reversed circulation of the refrigerant around the loop described above, indoor heat-exchanger 4 performs warming operation.

Figure 4:
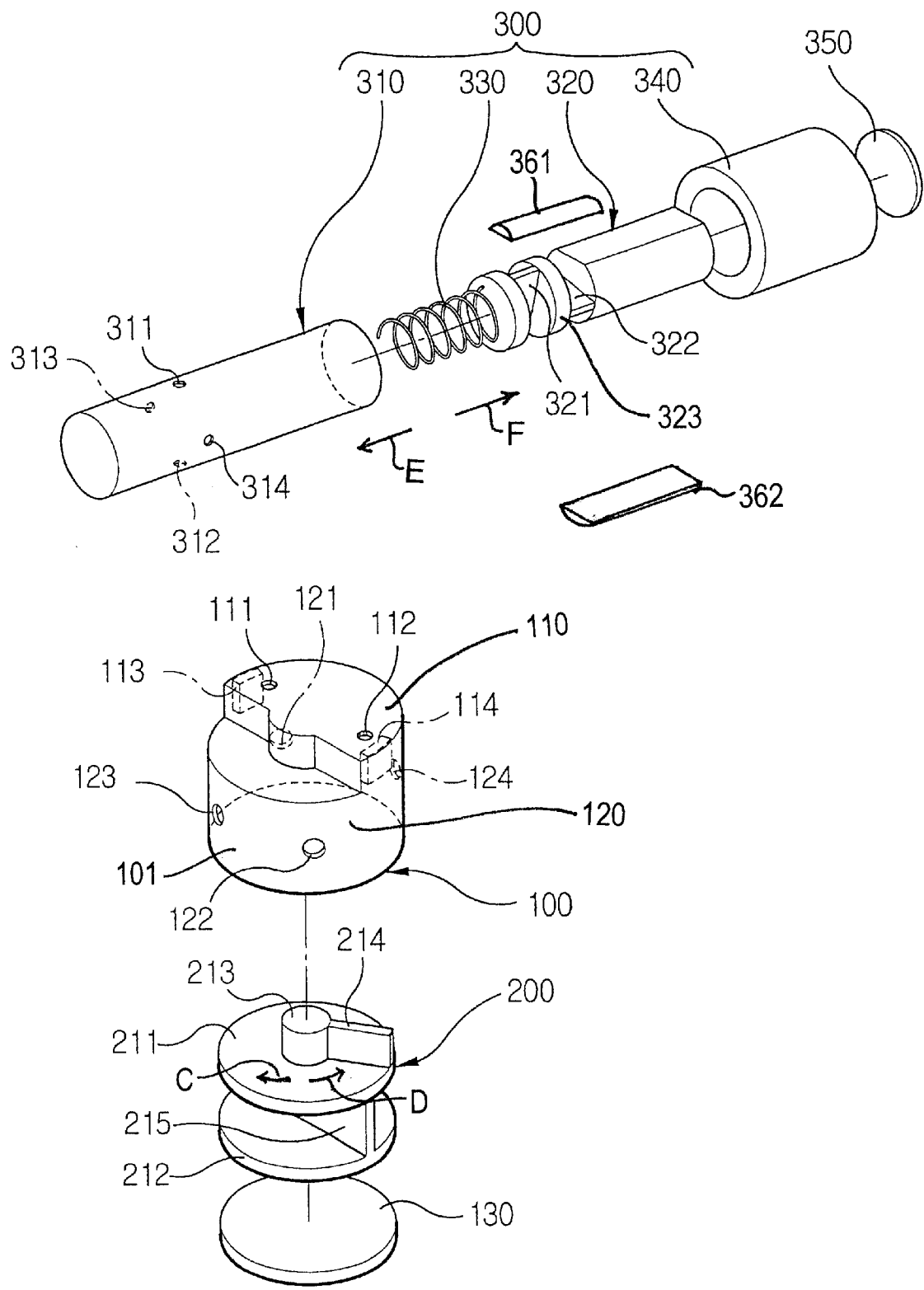
FIG. 4 is an exploded perspective view of a refrigerant channel switching apparatus of an air conditioner having cooling and warming functions according to the principle of the present invention.
Figure 5:
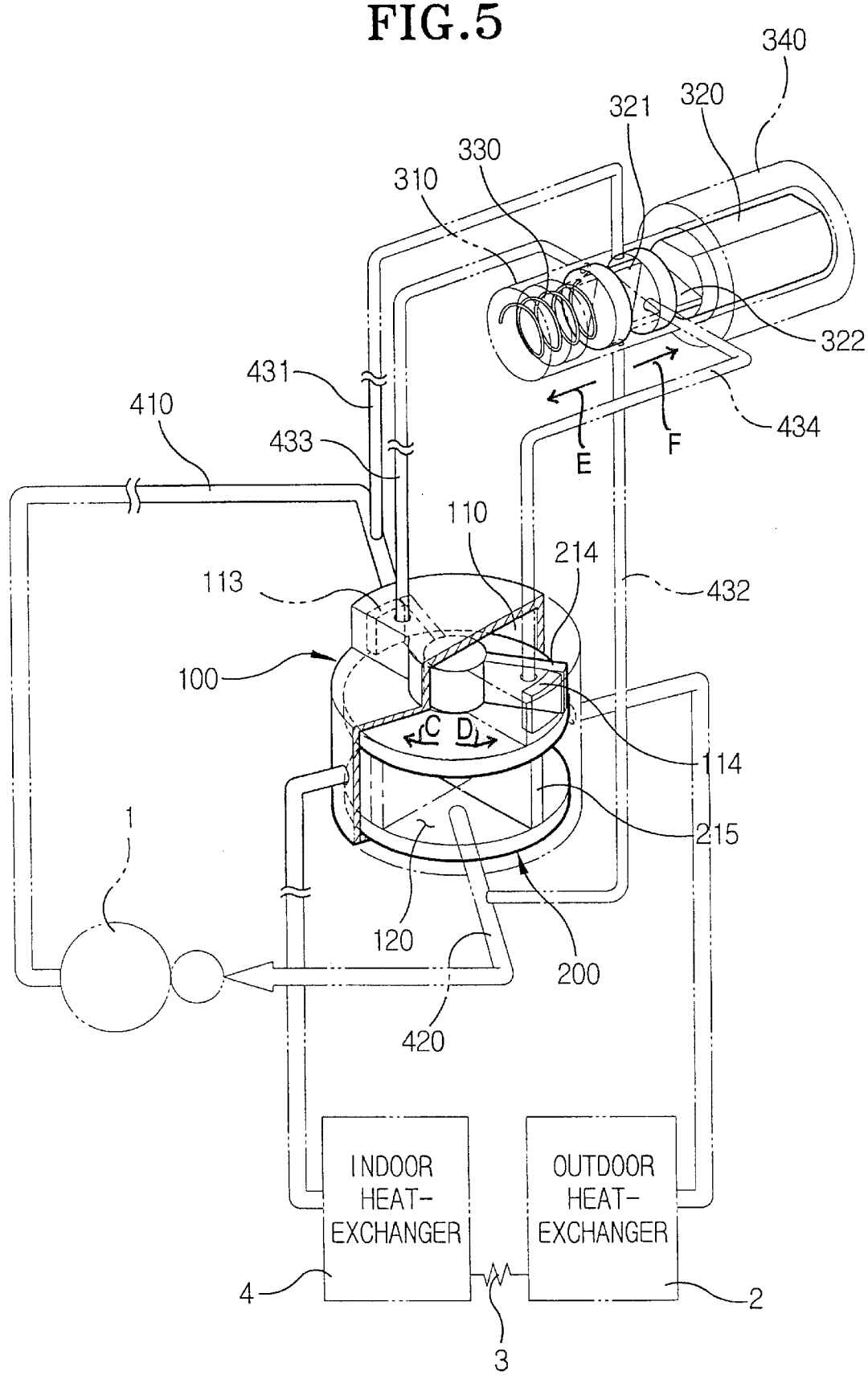
FIG. 5 is a partially cutaway perspective view showing the assembled refrigerant channel switching device of FIG. 4.

Another embodiment of the refrigerant channel switching apparatus according to the principle of the present invention is shown in FIGS. 4 and 5. The refrigerant channel switching apparatus includes a main valve body 100, a channel switching member 200 rotatably disposed inside of main valve body 100 to rotate in alternate direction about an axis passing through a center of main valve body 100, and a pilot valve 300 rotating channel switching member 200 about the axis by using a portion of the high pressure refrigerant discharged from compressor 1.

Main valve body 100 includes an operation chamber 110 having a semi-cylindrical shape, a direction shifting chamber 120 having a cylindrical shape, an opening 101 formed on a bottom side of direction shifting chamber 120, and a cover 130 for covering opening 101 of main valve body 100 and sealing main valve body.

A plurality of connecting ports are formed on an outer circumference of direction shifting chamber 120 at an equal interval. Preferably, connecting ports 121, 122, 123, and 124 are spaced-apart from each other at equal intervals of 90°. A high pressure connecting port 121 is coupled to refrigerant discharge port 41 of compressor 1. A low pressure connecting port 122 is coupled to refrigerant suction port 42 of compressor 1. An indoor heat-exchanger connecting port 123 and an outdoor heat-exchanger connecting port 124 are connected to indoor and outdoor heat-exchangers 4 and 2 respectively.

First and second connecting ports 111 and 112 are formed on operation chamber 110 and connected to pilot valve 300. A pair of stoppers 113 and 114 are attached to a circumferential inner sides of operation chamber 110 to limit the range of rotational movement of channel switching member 200. Cover 130 is attached to opening 101 of main valve body 100 either by welding or by a screw coupling method using a plurality of set screws after channel switching member 200 is inserted into the inside of main valve body 100.

Channel switching member 200 includes an upper plate 211 and a lower plate 212 which are spaced-apart from each other at a predetermined distance. Upper and lower plates 211 and 212 have almost the same size in a diameter as direction shifting chamber 120. A center bar 213 and the operational guide 214 are integrally formed on upper plate 211 while a partitioning 215 disposed between upper and lower plates 211 and 212 is integrally formed with upper and lower plates 211 and 212. Operational guide 214 and center bar 213 is positioned in the operation chamber 110, and partition 215 and upper and lower plates 211 and 212 are positioned in direction shifting chamber 120. Operational guide 214 and partitioning 215 are fixed to each side of upper plate 211. Operational guide 214 has a predetermined angle with respect to partitioning 215. When channel switching member 200 is inserted into main valve body 100, operational guide 214 is disposed between first and second connecting ports 111 and 112. Operational guide 214 moves between two stoppers to provide a first space for accommodating the fluid received through first connecting port 111 and a second space for accommodating the fluid received through second connecting port 112.

Channel switching member 200 rotates in alternate directions of arrows C and D within main valve body 100 by the high pressure refrigerant which is selectively supplied to operation chamber 110 through first connecting port 111 or second connecting port 112 from pilot valve 300. In accordance with the rotational movement of channel switching member 200, chamber partition 215 performs a refrigerant channel switching operation to form either first passageways so that high pressure connecting port 121 is communicated with indoor heat-exchanger connecting port 123 while low pressure connecting port 122 with outdoor heat-exchanger connecting port 124 or second passageways so that high pressure connecting port 121 is communicated with outdoor heat-exchanger connecting port 124 while low pressure connecting port 122 is communicated with indoor heat-exchanger connecting port 123.

Pilot valve 300 includes a cylindrical valve body 310, a piston 320 movably disposed inside of valve body 310 to linearly moves in a reciprocal manner, a spring 330 elastically biasing piston 320 toward a direction of arrow F, and a solenoid coil 340 attached to an outer circumference of valve body 310 and moving piston 320 against the elastic force of spring 330 in the direction of arrow E.

A cylindrical valve body 310 includes third, fourth, fifth, and sixth connecting ports 311, 312, 313, and 314 formed on an outer circumference of cylindrical valve body by certain intervals or by equal intervals of 90 and connected to the respective ports of the main valve body 100: high pressure connecting port 121; low pressure connecting port 122; and first and second connecting ports 111 and 112. Third connecting port 311 is connected to high pressure connecting port 121 of the main valve body 100 through a first pipe 414, fourth connecting port 312 is connected to low pressure connecting port 122 of the main valve body 100 through a second pipe 420, and fifth and sixth connecting ports 313 and 314 are connected to first and second connecting ports 111 and 112 of the main valve body 100, respectively through copper pipes 431, 432, 433, and 434.

Piston 320 includes first and second pilot partitions 321 and 322 which are spaced-apart from each other by a certain space interval. A disc is disposed t couple first and second pilot partitions 321 and 322. The plane of first pilot partition 321 has a perpendicular relationship with the plane of second pilot partition 322. First passageways are formed by first pilot partition 321 so that third and fifth connecting ports 311 and 313 are communicated with each other while the fourth and sixth connecting ports 312 and 314 are communicated with each other. Second passageways are formed by second pilot partition 322 so that third connecting port 311 and sixth connecting port 314 are communicated with each other while fourth and fifth connecting ports 312 and 313 are communicated with each other. In accordance with the linear and reciprocal movement of piston 320 in the direction of arrow E or F, such communications of the connecting ports are performed by first and second partitions 321 and 322 of piston 320 to form first and second passageways within valve body 310.

Initially, first pilot partition 321 of piston 320 is positioned to correspond to connecting ports 311, 312, 313, and 314 and to couple connecting third connecting port 311 to fifth connecting port 313 and fourth connecting port 312 to sixth connecting port 314. When solenoid coil 340 is activated as an electric current flows through solenoid coil 340, piston 320 moves against the elastic force of spring 330 in the direction of arrow E. Accordingly, second pilot partition 322 of piston 320 is positioned to correspond to the connecting ports 311, 312, 313, and 314 of valve body 310. Since second pilot partition 322 is disposed in a perpendicular relationship with first pilot partition 321, third and sixth connecting ports 311 and 314 and fourth and fifth connecting ports 312 and 313 are communicated with each other, respectively.

An opening 315 is formed on one end of cylindrical valve body 310. A cover 350 is securely attached to opening 315 by welding or by a screw coupling method using a plurality of set screws after spring 330 and piston 320 are inserted into the inside of cylindrical valve body 310 during assembling pilot valve 300. Piston 320 has at least one cutting portion on an upper side or an bottom side of piston 320. At least one piston guide member 361 or 361 is secured to the inside surface of cylindrical valve body 310 within a stroke of piston 320 and positioned to contact a rectangular surface of the cutting portion of piston 320, guide piston 320 to move in the direction of arrow E of F without rotational movement and exclusively permits the linear and reciprocal movement of piston 320 within valve body 310. Pilot valve 300 may be integrally installed in main valve body 100 so that the refrigerant channel switching apparatus is formed on a body.

Figure 6A:
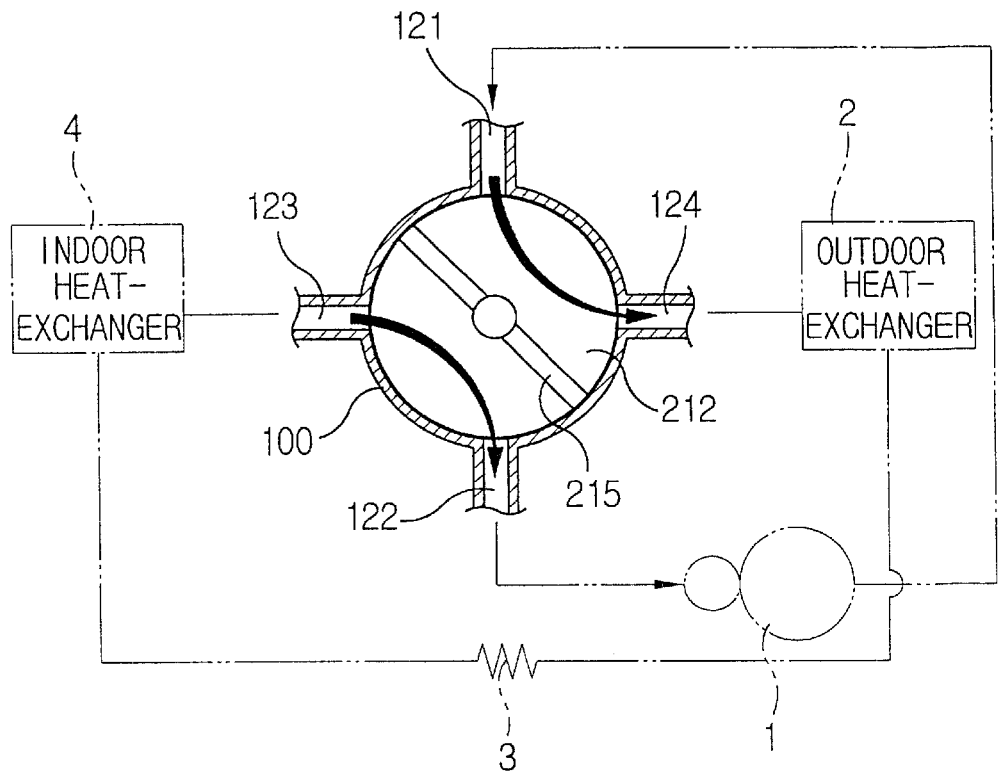
FIGS. 6A and 6B are schematic views of the refrigerant channel switching apparatus showing a direction shifting valve and a pilot valve during the cooling operation according to the principle of the present invention.
Figure 6B:
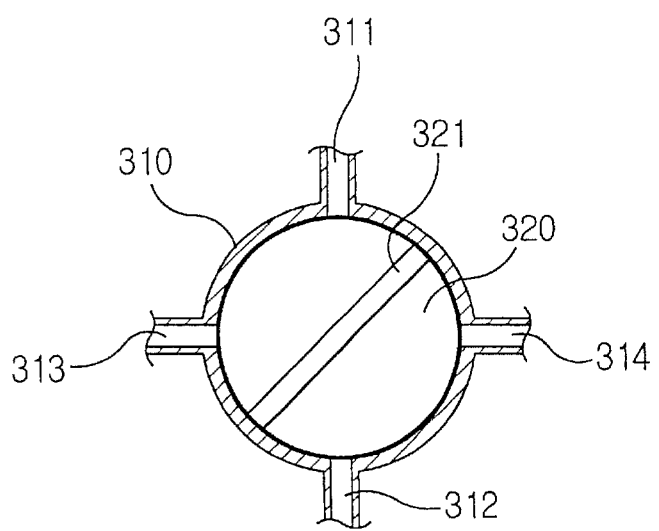
Figure 7A:
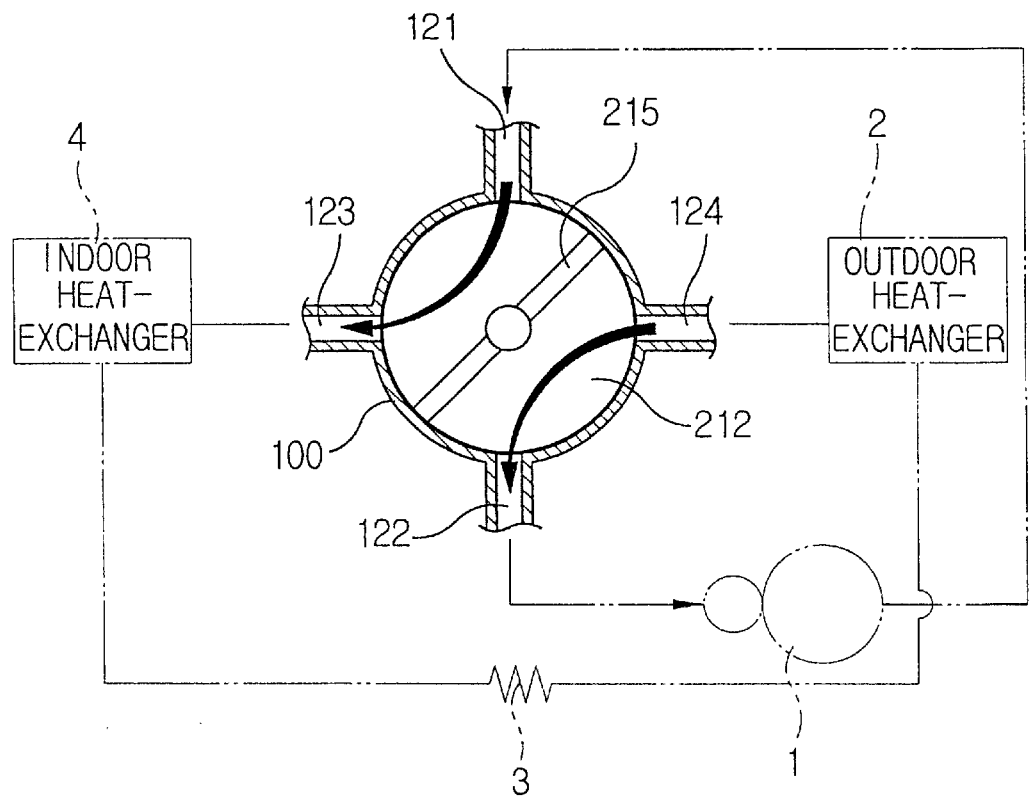
FIGS. 7A and 7B are schematic views of the refrigerant channel switching apparatus showing a direction shifting valve and a pilot valve during the warming operation according to the principle of the present invention.
Figure 7B:
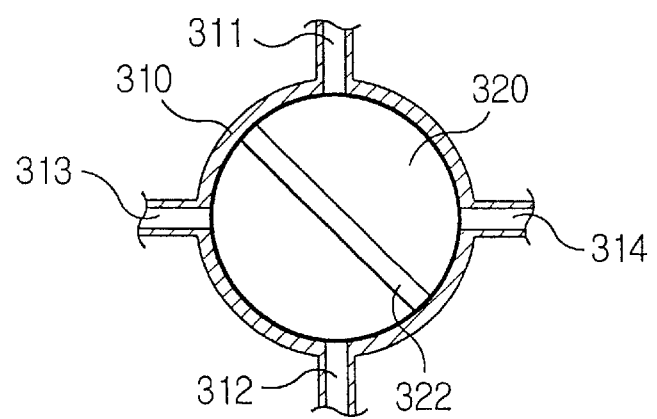

The operation of the refrigerant channel switching apparatus according to the principle of present invention will be described hereinafter in detail with reference to FIGS. 5, 6A, and 7B. As shown in FIG. 5, pilot valve 300 is elastically biased by spring 330 and moves in the direction of arrow F during the cooling operation so that first pilot partition 321 is positioned to correspond with connecting ports 311, 312, 313, and 314 of valve body 310. Accordingly, as shown in FIG. 6B, by first pilot partition 321 of piston 320, third and fifth connecting ports 311 and 313 of valve body 310 are communicated with each other while fourth and sixth connecting ports 312 and 314 are communicated with each other. Accordingly, a portion of the refrigerant discharged from compressor 1 is supplied to operation chamber 110 through third connecting port 311, fifth connecting port 313, and first connecting port 111 of main valve body 100. The supply of the refrigerant into first connecting port 111 of operating chamber 110 causes channel switching member 200 to rotate in the direction of arrow C. Stopper 113 formed on one side of operation chamber 110 stops the rotation of channel switching member 200 when operational guide member 214 comes in contact with stopper 113. In this situation, as shown in FIG. 6A, chamber partition 215 of channel switching member 200 partitions direction shifting chamber 120 in a manner that high pressure connecting port 121 is communicated with outdoor heat-exchanger connecting port 124 and that low pressure connecting port 122 is communicated with the indoor heat-exchanger connecting port 123. Thus, the refrigerant discharged from the compressor 1 sequentially circulates through outdoor heat-exchanger 2, expansion valve 3, indoor heat-exchanger 4, channel switching member 200, and compressor 1. The cooling operation is performed by indoor heat-exchanger 4 during circulation of the refrigerant within a closed loop formed by channel switching member 200.

If solenoid coil 340 of pilot valve 300 is activated during the cooling operation as a user manipulates a switch (not shown) in order to change the cooling operation to the warming operation, and the electric current is applied to solenoid coil 340 of pilot valve 300, piston 320 moves in the direction of arrow E against the elastic force of the spring 330. Second pilot partition 322 of piston 320 is positioned to correspond with connecting ports 311, 312, 313, and 314 of valve body 310. As a result, third and sixth connecting ports 311 and 314 of the valve body 310 are communicated with each other while fourth and fifth connecting ports 312 and 313 are also communicated with each other by second pilot partition 322 as shown in FIG. 7B. A portion of the refrigerant discharged from compressor 1 is supplied to operation chamber 110 through third connecting port 311, sixth connecting port 314, and second connecting port 112 of main valve body 100. The supply of the refrigerant into second connecting port 112 of operating chamber 110 causes channel switching member to rotate in the direction of arrow D. The rotation of the channel switching member 200 is stopped when operational portion 214 of channel switching member 200 comes in contact with the other stopper 113 formed on the operation chamber 110. As shown in FIG. 7A, the chamber partition 215 of channel switching member 200 partitions direction shifting chamber 120 in a manner that high pressure connecting port 121 is communicated with indoor heat-exchanger connecting port 123, and low pressure connecting port 122 is communicated with outdoor heat-exchanger connecting port 124.

Accordingly, the refrigerant discharged from the compressor 1 sequentially circulates through indoor heat-exchanger 4, expansion valve 3, outdoor heat-exchanger 2, channel switching member 200 and back to compressor 1. In this situation, the warming operation is performed by indoor heat-exchanger 4.

As described above, according to the principle of the present invention, it is very advantageous that the assembling process is simple because of the simple structure of the main valve body and the channel switching member switching the channel while rotating in the main valve body and also because of the reduced number of parts in the refrigerant channel switching apparatus of the air conditioner having the cooling and warming functions.

Furthermore, because the refrigerant channel switching apparatus according to the present invention has a rotatable channel switching structure switching the refrigerant channel while rotating in the main valve body the reliability of the valve is guaranteed for a long period of time.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. An apparatus of switching a channel in an air conditioner, comprising:
    a main body having a cylindrical hollow and an axis;
    a switching member disposed within said cylindrical hollow of said main body to rotate about said axis, having a single circular plate dividing said cylindrical hollow into an operating chamber and a channel switching chamber, having a main partition secured to a first side of said circular plate and disposed within said channel switching chamber to divide said channel switching chamber into two separate channel portions, having an operational guide secured to a second side of said circular plate opposite to said first side and disposed within said operating chamber to divide said operating chamber into two separate operation portions;
    first and second connecting ports each formed on one of said operation portions of said operating chamber;
    four main ports each two formed on one of said channel portions of said channel switching chamber; and
    a pilot valve connected to said first and second operating ports, selectively supplying a liquid into one of said operation portions of said operating chamber through one of said first and second operating ports in order to rotate said operational guide and said partition about said.

2. The apparatus of claim 1, with said main body comprising a cover secured to an opening of said main body after said switching member has been rotatably inserted into said main body through said opening.

3. The apparatus of claim 1, with said four main ports formed on a peripheral cylindrical surface of said channel switching chamber at equal space intervals of 90° about said axis.

4. The apparatus of claim 1, comprising:
    a bar holder formed on a central portion of said operating chamber; and a center bar formed on said second side of said circular plate and disposed within said bar holder to rotate about said axis.

5. The apparatus of claim 4, with said center bar secured to said operational guide and said second side of said circular plate.

6. The apparatus of claim 1, with said main body comprising a stopper formed on each one of said operation portions of said operating chamber and disposed between said first and second operating ports to limit rotational movement of said operational guide between said first and second operating ports.

7. The apparatus of claim 1, with said four main ports being spaced-apart from each other by a predetermined equal interval.

8. The apparatus of claim 1, with said four main ports comprising an inlet port, an outlet port, an indoor port, and an outdoor port connected to an output of a compressor, an input of said compressor, an indoor heat exchanger, and an outdoor heat exchanger respectively.

9. The apparatus of claim 8, with said switching member forming said two pairs of channels either connecting said inlet port to said indoor port and said outlet port to said outdoor port or connecting said inlet port to said outdoor port and said outlet to said indoor port.

10. The apparatus of claim 1, with switching member comprising said main partition having the same length as a diameter of said circular plate and located on a line passing through said axis.

11. The apparatus of claim 1, with said switching member comprising said circular plate, said operational guide, and said main partition all formed in a single body.

12. An apparatus, comprising:
a main body including an operating chamber and a channel switching chamber having a cylindrical hollow shape;
first and second connecting ports formed on a side of said operating chamber;
four main ports formed on a side of said channel switching chamber;
a switching member rotatably inserted into said main body, having a plate disposed between said operating chamber and said channel switching chamber, said switching member having a main partition secured to one side of said circular plate, disposed within said channel switching chamber, and forming two channels connecting each two of said four main ports, said switching member having an operational guide secured to the other side of said circular plate and disposed between said first and second ports within said operating chamber;
a pilot valve connected to said first and second operating ports, selectively supplying a liquid into said operating chamber through one of said first and second operating ports in order to move said operational guide and said partition; and
said pilot valve comprising:
a valve body having a cylindrical hollow shape;
four connecting ports formed on a first portion of said valve body;
a piston inserted into a second portion of said valve body and linearly and reciprocally moving within said valve body; and
an operating member attached to said piston, having a first operating partition and a second operating partition, one of said first and second operating partitions disposed on said first portion of said valve body in accordance with linear movement of said piston, forming two passageways connecting two pairs of said connecting ports.

13. The apparatus of claim 12, with said operating member comprising a plate disposed between said operating partitions spaced-apart from each other by a thickness of said plate.

14. The apparatus of claim 12, with said operating member comprising said first operating partition fixed to said piston while second operating partition is connected to said first operating partition through said plate and positioned in a perpendicular relation with respect to said first operating partition.

15. The apparatus of claim 12, with said connecting ports comprising first and second connecting ports connected to said first and second operating ports of said operating chamber respectively, one of third and fourth connecting ports connected to an external body supplying said liquid into said pilot valve.

16. The apparatus of claim 15, with said operating member comprising said first operating partition connecting said one of third and fourth connecting ports to either one of said first and second connecting port so as to supply said liquid to either one of first and second operating ports.

17. The apparatus of claim 12, further comprised of an elastic member disposed between said operating member and a side of said valve body to elastically support said piston to maintain said first operating partition in said first portion of said valve body.

18. The apparatus of claim 17, further comprised of a solenoid coil attached to an outer circumference of said valve body, moving said piston against the elastic force of said spring to locate said second operating partition in said first portion of said valve body.

19. A channel switching apparatus in an air conditioner, comprising:
a main body having a hollow and an axis;
a switching member disposed within said hollow of said main body to rotate about said axis, having a circular plate dividing said hollow of said main body into an operating chamber and a channel switching chamber, having a partition secured to one side of said circular plate and disposed within said channel switching chamber to divide said channel switching chamber into two channel spaces, having an operational guide secured to the other side of said circular plate opposite to said one side and disposed within said operating chamber to divide said operating chamber into two operation spaces;
a pilot unit connected to said operating chamber, rotating said operational guide and said switching member about said axis of said switching member; and
four ports formed on a side of said channel switching member, divided into two pairs of ports by said partition in response to the rotation of said partition and said switching member, each pair of ports communicated with one of said two channel spaces.

20. The apparatus of claim 19, with said four ports being spaced-apart from each other by a predetermined interval on outer peripheral surface of said switching chamber.

21. The apparatus of claim 19, with said four ports comprising an inlet port, an outlet port, an indoor port, and an outdoor port connected to an output of a compressor, an input of said compressor, an indoor heat exchanger, and an outdoor heat exchanger respectively.

22. The apparatus of claim 21, with said switching member connecting said inlet port to one of said indoor port and said outdoor port by one of two spaces while said outlet port is connected to the other one of said indoor port and said outdoor port by the other one of two spaces in accordance with rotation of said switching member and said partition.

23. The apparatus of claim 19, with switching member comprising said main partition having the same length as a diameter of said circular plate and located on a line passing through said axis.

24. The apparatus of claim 19, with said switching member comprising said circular plate, said operational guide, and said main partition all formed in a single body.

25. The apparatus of claim 19, with said main body comprising at least one stopper attached to said operating chamber and limiting a range of rotational movement of said operational guide and said partition.

26. The apparatus of claim 19, with said pilot unit integrally formed on said main body.

27. The apparatus of claim 1, wherein said circular plate, said main partition, and said operational guide are made in a single body.

28. The apparatus of claim 1, wherein said circular plate is perpendicular to said main partition and said operational guide.

29. The apparatus of claim 19, wherein said plate, said partition, and said operational guide are made in a monolithic structure.

30. The apparatus of claim 19, wherein said plate is perpendicular to said partition and said operation guide.

* * * * *